(12) United States Patent
Corbett, Jr. et al.

(10) Patent No.: US 7,441,319 B2
(45) Date of Patent: *Oct. 28, 2008

(54) SNAP FIT SEALING GASKET WITH PRECISELY LOCATED INTERNAL RETAINER RING FOR TRIANGULAR PIPE GROOVES

(75) Inventors: Bradford G. Corbett, Jr., Fort Worth, TX (US); Guido Quesada, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 144 days.

This patent is subject to a terminal disclaimer.

(21) Appl. No.: 11/293,969

(22) Filed: Dec. 5, 2005

(65) Prior Publication Data

US 2006/0181031 A1 Aug. 17, 2006

Related U.S. Application Data

(60) Provisional application No. 60/633,943, filed on Dec. 7, 2004, provisional application No. 60/633,889, filed on Dec. 7, 2004.

(51) Int. Cl.
*B23P 11/02* (2006.01)
*F16L 17/06* (2006.01)

(52) U.S. Cl. .............. 29/451; 29/450; 29/453; 277/608; 277/626

(58) Field of Classification Search .......... 29/450, 29/451, 453; 277/608, 615, 616, 626; 285/345, 285/379
See application file for complete search history.

(56) References Cited

U.S. PATENT DOCUMENTS

| | | | | |
|---|---|---|---|---|
| 3,647,229 A | * | 3/1972 | Grimes | 277/615 |
| 4,299,412 A | * | 11/1981 | Parmann | 285/110 |
| 4,336,014 A | * | 6/1982 | Parmann | 425/403 |
| 4,368,894 A | | 1/1983 | Parmann | 277/166 |
| 4,372,905 A | * | 2/1983 | Bohman | 264/249 |
| 4,379,559 A | * | 4/1983 | Bohman | 277/615 |
| 4,572,523 A | | 2/1986 | Guettouche et al. | 277/207 |
| 4,625,383 A | * | 12/1986 | Vassallo et al. | 29/445 |
| 4,826,028 A | * | 5/1989 | Vassallo et al. | 277/615 |
| 4,916,799 A | * | 4/1990 | Skinner et al. | 29/450 |
| 6,105,972 A | * | 8/2000 | Guzowski | 277/604 |
| 6,113,159 A | * | 9/2000 | Corbett, Jr. | 285/345 |
| 6,152,494 A | * | 11/2000 | Corbett et al. | 285/110 |
| 6,457,718 B1 | * | 10/2002 | Quesada | 277/314 |
| 7,284,310 B2 | * | 10/2007 | Jones et al. | 29/447 |
| 2004/0130103 A1 | | 7/2004 | Corbett, Jr. | 277/602 |

* cited by examiner

*Primary Examiner*—Essama Omgba
(74) *Attorney, Agent, or Firm*—Charles D. Gunter, Jr.

(57) ABSTRACT

A pipe sealing gasket is shown which is designed to be received within a groove provided within the belled, socket end of a plastic pipe. The sealing gasket has a body formed of resilient material and has a retainer ring embedded therein which circumscribes the gasket body. The groove in the plastic pipe is preformed during the manufacture of the plastic pipe and the gasket is installed thereafter. The gasket nominal diameter exceeds the internal diameter of the belled pipe end. The retainer ring is placed within the body of the sealing gasket at a precisely determined location which most effectively retains the ring in position while withstanding the forces of the assembly of the pipe joint.

8 Claims, 4 Drawing Sheets

SNAP FIT SEALING GASKET WITH PRECISELY LOCATED INTERNAL RETAINER RING FOR TRIANGULAR PIPE GROOVES

CROSS REFERENCE TO RELATED APPLICATIONS

This case claims priority from U.S. Provisional Patent Application No. 60/633,943, filed Dec. 07, 2004, and is related to the companion case, U.S. Provisional Application No. 60/633,889, filed Dec. 07, 2004, entitled "Snap Fit Sealing Gasket with Precisely Located Internal Retainer Ring For Square Pipe Grooves," by the same inventors, which was filed concurrently.

BACKGROUND OF THE INVENTION

1. Field of the Invention

The present invention relates generally to sealing gaskets used for pipe joints in which a male spigot pipe section is installed within a mating female socket pipe section and, more specifically, to an improved gasket and installation method for installing a locked-in gasket within a preformed gasket groove in a section of pipe used to form a pipe joint. 2. Description of the Prior Art Pipes formed from thermoplastic materials including polyethylene, polypropylene and polyvinyl chloride are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

One early attempt to ensure the integrity of pipe joints used under demanding conditions was to provide local reinforcement of the groove portion of the female socket end by means of a heavier wall thickness in this region of the pipe. In some cases, reinforcing sleeves were also utilized. Each of these solutions was less than ideal, in some cases failing to provide the needed joint integrity and often contributing to the complexity and expense of the manufacturing operation.

In several of the prior art commercial systems using pipes with preformed grooves, the sealing gaskets were provided in two parts. The main gasket body was formed of an elastomeric material and typically featured an internal groove or recess. A hardened band, formed of rigid plastic or metal, was installed within the groove. While such retaining bands helped to resist axial forces acting on the gasket during assembly of the joint, the band could become displaced or twisted during the insertion operation.

In the early 1970's, a new technology was developed by Rieber & Son of Bergen, Norway, referred to in the industry as the "Rieber Joint." The Rieber system employed a unique pipe belling operation which seated the sealing gasket during belling. In the Rieber process, an elastomeric gasket was installed within an internal groove in the socket end of the female pipe as the female or belling end was simultaneously being formed by forcing the belling end over a forming mandrel. Rather than utilizing a preformed groove, the Rieber process provided a prestressed and anchored elastomeric gasket during the belling operation. Because the pipe groove was, in a sense, formed around the gasket, the gasket was securely retained in position and did not tend to twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

Despite the advances offered by the Rieber process, the belling operation was somewhat complicated and costly. Also, certain situations exist in which it would be desirable to install a gasket within a preformed groove in the selected pipe end, rather than utilizing an integrally installed gasket in which the groove in the pipe is formed around the gasket.

The present invention has, as one object, to provide an improved pipe gasket for use in pipe joints which offers the advantage of a Rieber type locked-in seal while allowing the gasket to be installed in a preformed groove.

Another object of the invention is to provide an improved gasket which is securely retained within a preformed pipe groove without the necessity of a separate retaining band.

Another object of the invention is to provide a design formula for precisely locating an internal retaining ring within the elastomeric body of a sealing gasket which is thereafter inserted in a preformed pipe groove.

Another object of the invention is to provide a method for installing a gasket having a known external diameter and having an internal retainer ring within the mouth opening of a bell end of a pipe section where the external diameter of the gasket exceeds the nominal internal diameter of the mouth opening and where the location of the retainer ring is predetermined to facilitate the insertion process.

SUMMARY OF THE INVENTION

A method is shown for installing a sealing gasket within a preformed gasket-receiving groove provided within the bell end of a pipe section. The bell end has a mouth opening which is engageable with a spigot end of a mating pipe section to form a pipe joint. The pipe section having the bell end is first oriented along a longitudinal work axis. A sealing gasket is then inserted within the mouth opening of the bell end. The sealing gasket is oriented at an oblique angle with respect to the longitudinal work axis, whereby a leading edge of the sealing gasket moves past the annular groove provided in the bell end. A retracting force is then exerted on the sealing gasket by pulling the leading edge thereof backwards in the direction of the mouth opening of the bell end until the gasket snaps into a locked-in position within the annular groove.

An improved sealing gasket design is also shown having a body formed of a flexible elastomeric material and having a relatively rigid ring which is located at an embedded location which circumscribes the gasket body at one circumferential location. Preferably, the relatively rigid ring is made of a metal such as steel or a rigid plastic or composite and is generally round in cross-section. The relatively rigid ring tends to resist axial forces tending to displace the gasket from the annular groove when in position within the groove. The embedded location of the ring is precisely determined to allow the gasket to be obliquely inserted within the bell end of the pipe and subsequently snap-fitted into position while securely retaining the gasket in position, whereby the gasket is securely retained in a locked-in position within the preformed groove in the pipe belled end.

Additional objects, features and advantages will be apparent in the written description which follows.

DETAILED DESCRIPTION OF THE INVENTION

The improved sealing gasket of the invention is installed within a gasket receiving groove which is preformed within the bell end 19 of a section of thermoplastic pipe. The pipe section can be formed of any of a variety of commercially available thermoplastic materials, such as the polyolefin family including polyethylene and polypropylene as well as polyvinyl chloride and similar materials. Thermoplastic pipes of this general type are used in a variety of industrial settings including water, sewage and chemical industries. The bell end 19 of the thermoplastic pipe section has a mouth opening which is engageable with a spigot end of a mating pipe section to form a pipe joint. By "preformed" is meant that the gasket receiving groove was formed at the pipe manufacturing facility with the intention that a sealing gasket then be installed in the groove at the factory, or that a gasket be later installed in the field. The use of the term "reformed" is intended to distinguish Rieber style pipe which the sealing gasket is simultaneously sealed during the pipe belling operation.

Figure 7:
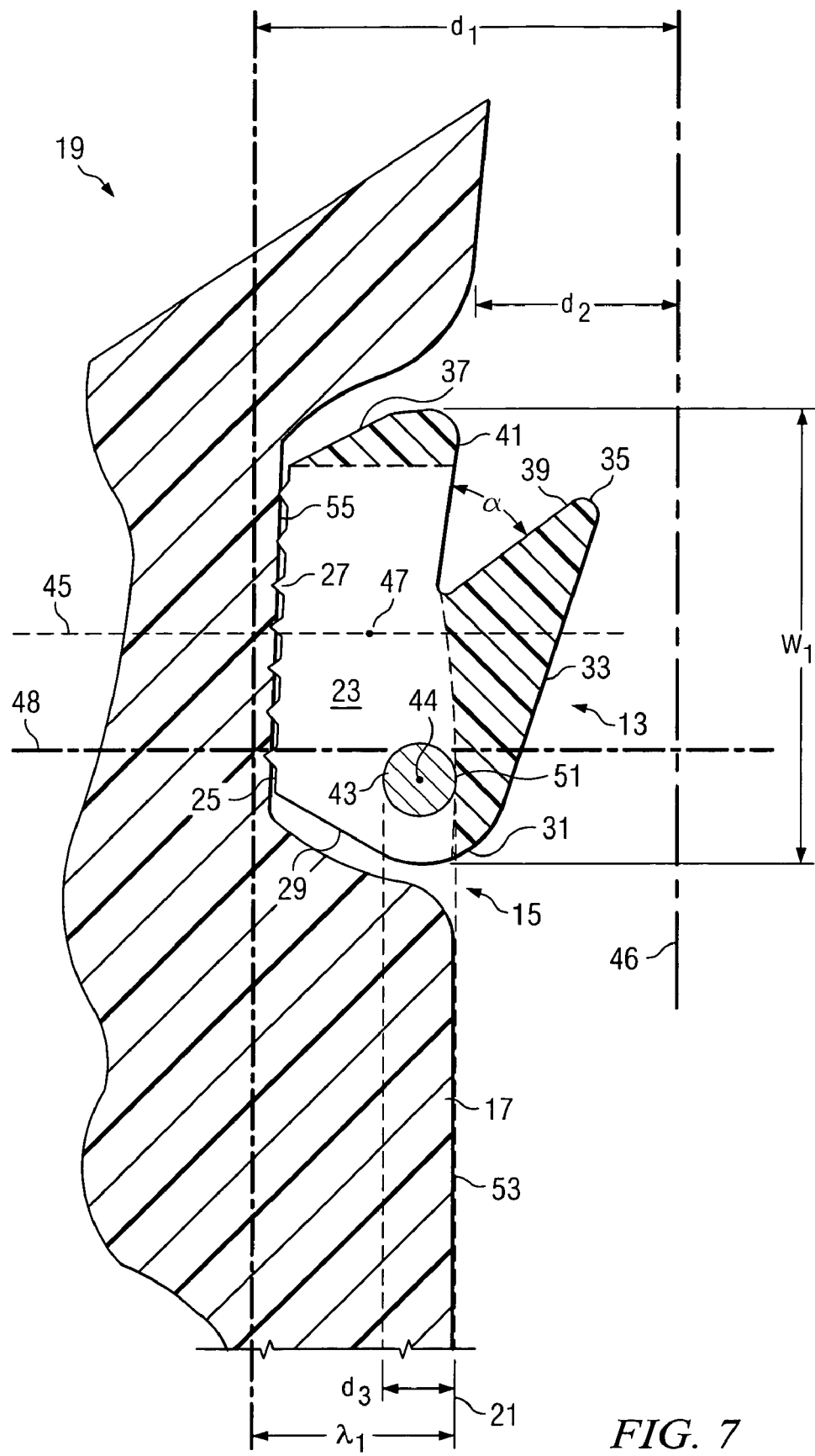
FIG. 7 is a side cross-sectional view of a typical sealing gasket of the type under consideration located in a preformed groove of a bell pipe end and illustrating the placement of the retainer ring therein as well as the groove geometry.

A sealing gasket of the general type under consideration is shown in cross section as 13 in FIG. 7. Preferably, the gasket 13 is an annular, ring-shaped member formed of a flexible elastomeric material, such as a suitable rubber. As will be apparent from FIG. 7, the gasket 13 has an external diameter "$d_1$" which is greater than the internal diameter "$d_2$" of the mouth opening of the bell end of the pipe (it being understood that the diameters referred to herein as "$d_1$" and "$d_2$" are actually "half-diameters" as viewed in the quarter sectional view of FIG. 7). The elastomeric material used to form the body 23 will vary in composition depending upon the end application but may include natural and synthetic rubbers including, for example, SBR, EPDM, NBR, nitrile rubber, etc. In the embodiment of the gasket shown in FIG. 7, the gasket includes an inner sealing surface 25 which, in this case, is provided with a series of ribs or serrations 27. The gasket includes a leading face 29 which joins a convex nose region 31 which continues on to form a primary sealing surface 33. In this case, the primary sealing surface 33 is an evenly sloping, outer face of the body 23 which forms a lip region 35 thereof. The lip region is separated from a trailing face 37 of the gasket body by means of convex regions 39, 41 which allows the lip region 35 to "flap" inwardly as the mating male, spigot end of a mating pipe section encounters the primary sealing surface 33 of the gasket and pushes the lip region 35 in the direction of the surface 41. The lip region 35 is actually shown compressed slightly inwardly in FIG. 7. The gasket 13 in FIG. 7 is intended to merely represent the type of sealing gasket toward which the principles of the present invention can be applied.

Figure 1:
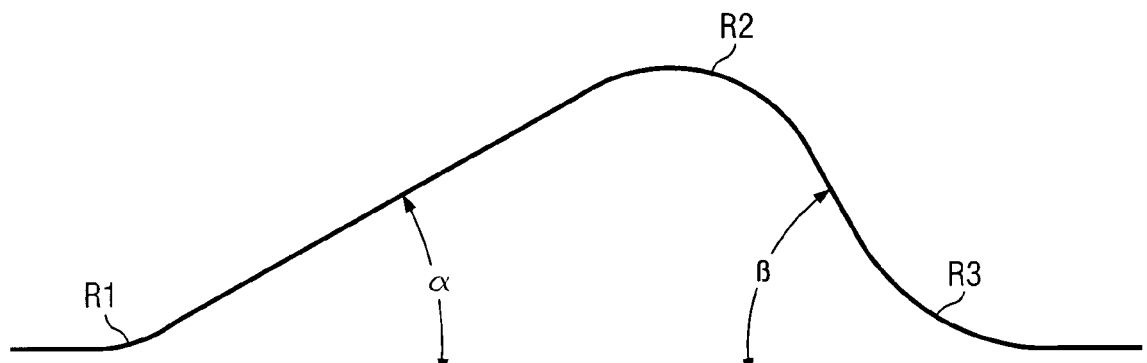
FIG. 1 is a simplified side cross sectional view of the preformed gasket receiving groove formed in the bell pipe end of the pipe joint of the invention.

The gasket body 23 also has a relatively rigid ring 43 embedded therein having a midpoint 44. The relatively rigid ring 43 can be made of a variety of relatively rigid materials such as metals, rigid plastics and composites, but is preferably made of steel. The relatively rigid ring is generally round in cross-section, as shown in FIG. 1, and circumscribes the annular body 23 of the gasket 13 at one embedded, circumferential location.

The positioning of the relatively rigid ring within the gasket body is critical to the method of the invention. Previously, the ring location was determined primarily by trial and error and was influenced by such factors as manufacturing constraints. In the particular embodiment of the gasket shown in FIG. 7, the axis 45 passes through the approximate mid-point 47 of the gasket body 13. The relatively rigid ring 43 is located in front of the vertical axis 45 as viewed along the longitudinal axis of the pipe 46 in a location adjacent the convex nose region 31. The relatively rigid ring 43 also has a cross-sectional diameter ("$d_3$" in FIG. 7) and an internal diameter which defines a locus of points (e.g., point 51) which is equal to or greater than the internal diameter ("$d_2$" in FIG. 7) of the bell end of the pipe which joins the annular groove 15.

In other words, if a point 51 on the inner surface of the ring 43 is one point in the locus of points, an imaginary line 53 drawn tangent to the point 51 is approximately at the internal diameter "$d_2$" of the pipe or is located further inward in the direction of the bottom surface 55 of the groove 15.

The relatively rigid ring 43 of the annular gasket tends to resist axial forces tending to displace the gasket from the annular groove 15 when in position within the groove. To position the ring 43 at a location within the gasket body 23 so that it resides partly or wholly within the groove 15 at first seems unexpected, since the ring diameter then exceeds the normal pipe diameter "$d_2$". As will be explained in detail, the sealing gasket of the invention has the retainer ring 43 precisely located to both insure that the gasket will not flip or twist or be dislocated, while at the same time achieving the greatest ease of installation. The method of the invention also provides a convenient mechanism for installing the gasket within the preformed pipe groove, even with a relatively rigid ring whose ultimate internal diameter equals or exceeds the internal diameter of the remainder of the pipe.

The present invention contains the results of an analytical study of the geometrical conditions for a feasible installation of a sealing gasket with a retainer steel ring into a typical socket for plastic pressure pipe, with the type of "triangular" groove frequently encountered in industry. By "triangular" is meant a radiussed groove such as that shown in FIG. 1, which groove is to be distinguished from the "square" groove used in some applications. The inventive method generates a series of ratios initially developed in 3D but presented herein in 2D which characterize the degree of difficulty and possible permanent damage during the assembly of male and female pipes to form a pipe joint. These ratios, in combination with manufacturing constraints, can be used to define the best location for the retainer ring 43. This methodology can be extended to other groove shapes and seal designs in a straightforward manner.

Modeling Considerations: The assembly is modeled as a study of 3D geometric paths superimposed on a 2D drawing. The analysis which follows is based on the assumption that the retainer ring will slide along a path that is defined by the rubber thickness around it. The path is drawn by generating an offset from the bell profile using this thickness. Since the ring is fairly flexible, it is reasonable to neglect the compression in the rubber. Once the ratios are defined, this path is no longer required, so it is excluded from the drawings.

Basic Geometric Data: The geometrical data was taken from an existing sealing gasket profile.

Mechanical Properties: Mechanical Properties are not considered. It is assumed that the ring and the rubber are flexible enough to bend and twist as necessary to be installed, but incompressible enough to retain their basic thickness.

Figure 2:
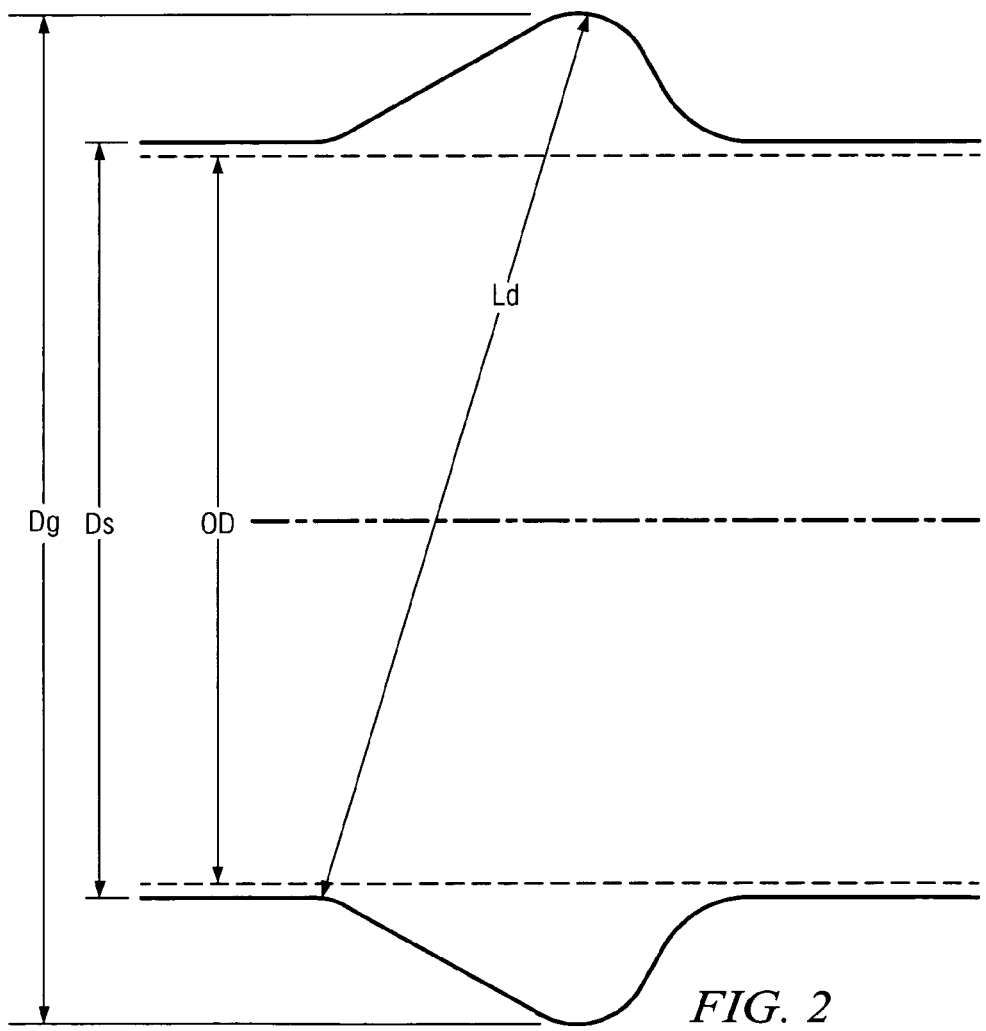
FIG. 2 is a view of the basic joint dimensions of the pipe joint which uses the sealing gasket of the invention. 1.
Figure 3:
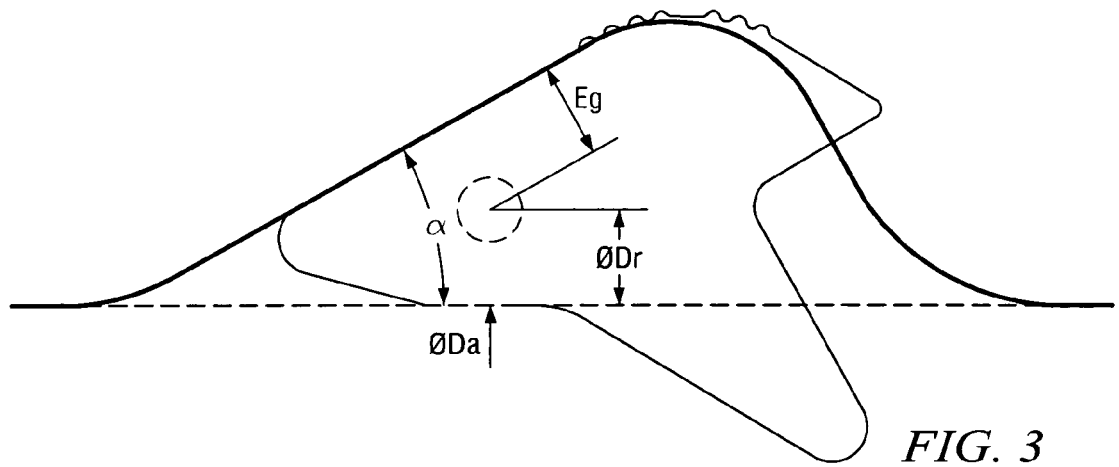
FIG. 3 a side cross-sectional view of a sealing gasket of the invention showing the relative dimensions of the gasket and retainer ring.

Joint Dimensions: FIGS. 2 and 3 illustrate the basic joint dimensions. The parameters presented allow a designer to consider the values that are most likely and critical. The most critical values are maximum spigot dimensions (OD) and minimum socket dimensions (all the other dimensions shown). Relevant dimensions are listed in the Table 1 below.

TABLE 1

Joint Dimensions

| Symbol | Name | Comments |
|---|---|---|
| OD | Spigot Diameter | Use maximum for critical condition. |
| $D_s$ | Socket Diameter | Use minimum for critical condition. |
| $L_d$ | Diagonal Length | Distance from the bottom of the groove to the edge of the groove on the opposite side, along a line that passes through the centers of the corresponding fillets. In the current example it is obtained by geometric construction. It might also be calculated from other basic dimensions. |
| $D_g$ | Groove Diameter | Use minimum for critical condition. |
| $R_1$ | Lip side fillet radius | This dimension is required for the construction of the $L_d$ dimension. |
| $R_2$ | Bottom fillet radius | This dimension is required for the construction of the $L_d$ dimension. |
| $\alpha$ | Lip side angle | Typically 30° |

Seal Dimensions: Only three dimensions are required for the purpose of analysis of the ring location. These are shown in FIG. 3 of the drawings and are described in Table 2 which follows. The angle $\alpha$ is usually very close to the corresponding angle in the joint. It can be safely assumed that it is the same.

TABLE 2

Seal Dimensions

| Symbol | Name | Comments |
|---|---|---|
| $D_a$ | Alignment ramp diameter | Used to apply manufacturing constraints to the ring diameter $D_r$. |
| $E_g$ | Distance to groove wall | Together with $D_r$ defines the ring location. |
| $D_r$ | Ring diameter | Together with $E_g$ defines the ring location. |

Figure 4:
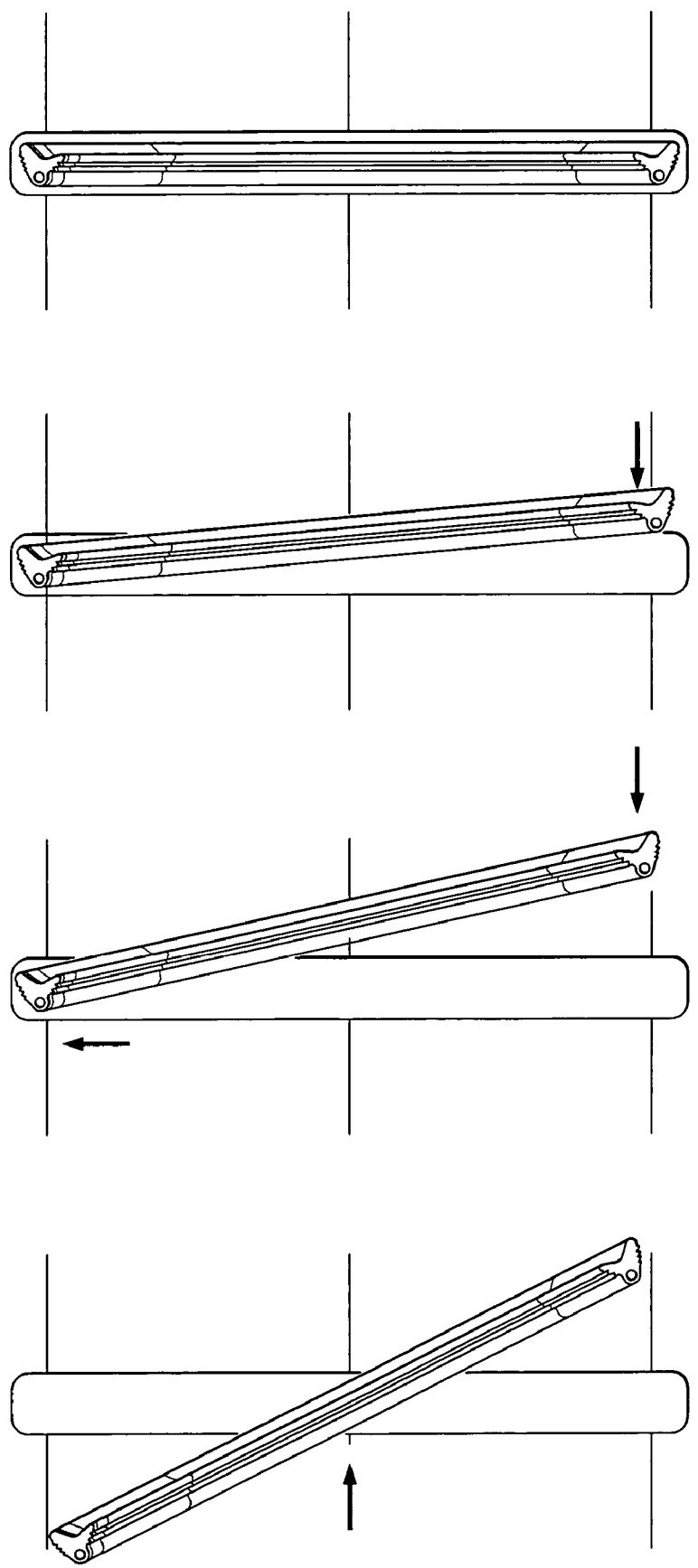
FIG. 4 is a simplified, schematic view of the installation procedure used to install a sealing gasket of the invention within a mating pipe groove in the bell pipe end of the pipe joint.

Installation Procedure: In order to install the seal, the ring is deformed into an oval shape that can be approximated as an ellipse. FIG. 4 of the drawings illustrates the stages in a typical sealing ring installation. First a pipe section 19 is provided having a bell end opening. The pipe section having the bell end opening is oriented along a longitudinal work axis which is usually conveniently a horizontal axis, although other axes are conceivable. The sealing gasket 19, typically formed of rubber, is provided having a relatively rigid internal retainer ring 43 which circumscribes the gasket interior at one circumferential location. The sealing gasket is temporarily transformed from a generally cylindrical shape to a generally elliptical shape to allow the gasket to be inserted within the bell end of the pipe.

The left most view in FIG. 4 shows the gasket 19 being inserted within the mouth opening of the bell pipe end, the annular gasket being oriented at an oblique angle with respect to the horizontal work axis. As shown from left to right in FIG. 4, this allows a trailing edge of the gasket to engage the annular groove, and a leading edge of the annular gasket to be moved past the annular groove provided in the bell end. A retracting force is then exerted on the annular gasket by pulling the leading edge thereof backwards in the direction of the mouth opening of the bell end until the gasket again assumes a generally cylindrical shape and snaps into a locked-in position within the annular groove.

The above procedure allows the sealing gasket to travel inside the socket although its diameter is greater than the socket ID. The perimeter of this ellipse can be calculated from its maximum and minimum diameters at critical stages of the assembly. These diameters can be estimated from the joint dimensions. The viability of installing the ring can be established by comparing these parameters to the original ring perimeter, which is fixed. This comparison is equivalent to comparing the corresponding diameters.

Installation ratios: Depending on how much the oval is bent or distorted, three different types of installation conditions have been defined, with their corresponding diameter ratios. These conditions are defined in Table 3 which follows. When each ratio becomes less than 1, the corresponding kind of installation is feasible. As the ratios become larger, the installation becomes increasingly difficult.

TABLE 3

Definition of installation types and their ratios

| Type of installation | Comments | Ratio |
|---|---|---|
| Easy | The oval remains flat at all times. Minimum seal distortion. Little force is required for the assembly. | $R_{ie} = \dfrac{2D_R}{D_S + L_D - 4E_G}$ |
| Forced | Forced installation. The oval should remain flat, but it can still be slightly bent outwards from its basic plane, because installation force is not evenly applied. | $R_{if} = \dfrac{2D_R}{D_R + L_D - 2E_G}$ |
| Bent | Difficult installation, the oval has to bend outward from its original plane (it is no longer flat). This can produce permanent deformation and severe distortion in the ring. | $R_{ib} = \dfrac{2D_R}{L_D + D_G - 4E_G}$ |

Additionally, in order to assess the ability of the ring to remain in position, a retention ratio is defined, which is simply $D_r/D_s$. The greater this ratio, the more difficult it is to remove the ring after installation.

Manufacturing Constraints: The thickness of rubber around the steel ring is handled as a manufacturing constraint. As shown in the following figure, two constraint parameters establish the minimum rubber thickness on the groove side ($T_g$) and on the spigot side ($T_s$). The Table 4 which follows defines the constraints on the ring location, considering that the location is defined at its center. $D_w$ being the ring wire diameter. While these equations may change depending upon the joint shape, they can be easily modified accordingly or replaced by an equivalent graphical procedure.

TABLE 4

Manufacturing constraints on ring location

| Constraint | Equation |
|---|---|
| Rubber thickness on groove side | $E_g \geq T_g + \dfrac{D_w}{2}$ |
| Rubber thickness on spigot side | $D_r \geq D_a + 2T_s + D_w$ |

Mapping of Installation Ratios: The regions defined by the installation ratios can be mapped on a 2D sketch, so that the difficulty of installation can be visualized, together with the manufacturing constraints.

Figure 5:
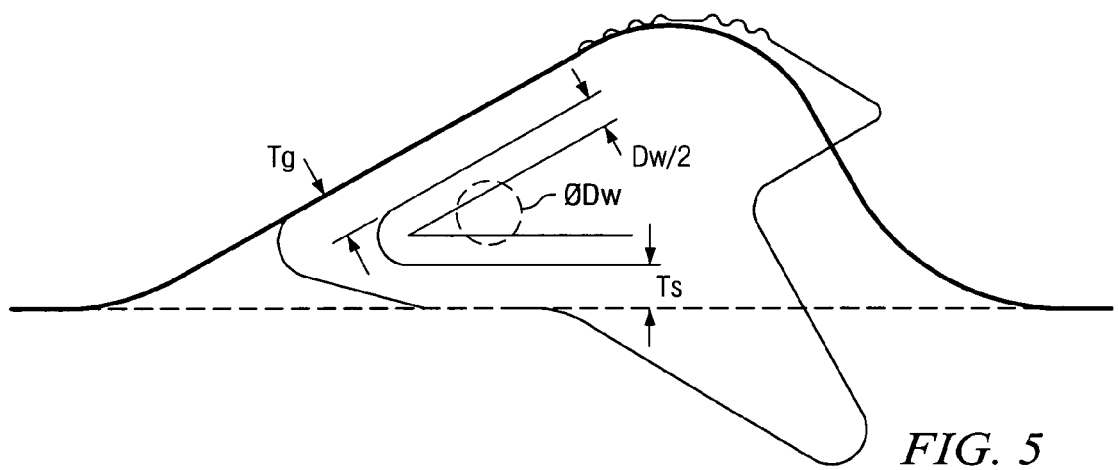
FIG. 5 is a side cross sectional view similar to FIG. 4 illustrating the manufacturing constraints which are taken into account in determining the retainer ring placement.

A reference line where each type of assembly becomes feasible can be found by setting each of the installation ratios to 1. In all cases, this line runs at an angle α/2 with respect to the vertical (see FIG. 5). Furthermore, the diameter at which these lines intersect the groove wall can be found by setting the distance $E_g$ to 0. This generates the equations listed in Table 5 which follows.

TABLE 5

Reference Diameters for Mapping of Installation Ratios

| Settings | Comments | Ratio |
|---|---|---|
| $R_{ie} = 1$, $E_g = 0$ | Defines the diameter at which the line where easy installation becomes feasible intersects the groove wall. | $D_{roe} = \dfrac{D_s + L_d}{2}$ |
| $R_{if} = 1$, $E_g = 0$ | Defines the diameter at which the line where forced installation becomes feasible intersects the groove wall. | $D_{rof} = L_d$ |
| $R_{ib} = 1$, $E_g = 0$ | Defines the diameter at which the line where bent installation becomes feasible intersects the groove wall. | $D_{rob} = \dfrac{L_d + D_g}{2}$ |

The line where $R_{ib}$ becomes 1 can be used to close the region defined by manufacturing constraints. Locating the ring anywhere beyond this line would make installation impossible, at least given the seal shape and installation method under consideration.

Figure 6:
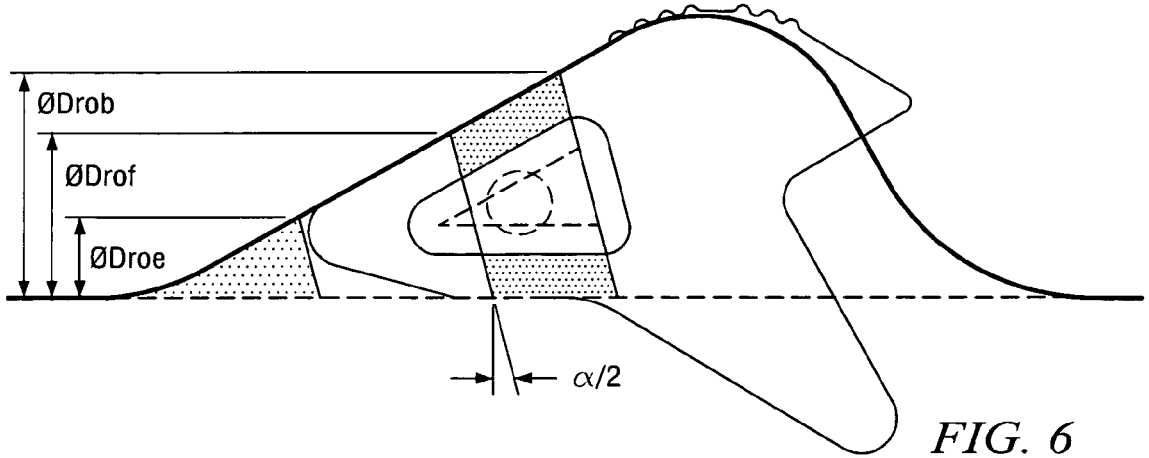
FIG. 6 is a two dimensional model of a pipe groove showing a sealing gasket of the invention installed therein and characterizing the degree of difficulty in installing a sealing gasket having a steel retainer ring into a typical sewer pipe.

This defines the three installation regions (easy, forced and bent), as shown on FIG. 6 which follows. Notice that these regions may lie outside of the region defined by manufacturing constraints. Darker areas define the region that is swept by the ring, including its thickness.

According to this mapping, in the example illustrated it is not possible to find a ring location for easy installation, due to manufacturing constraints. The best possible ring location would be as far as possible to the left inside the triangle defined by manufacturing constraints. In this case the installation would be forced. The other locations defined by manufacturing constraints fall in the region where the assembly would require bending the ring out of its original plane. Mathematically, this can be expressed by the formula:

$$R_{ib} = \frac{2D_R}{L_D + D_G - 4E_G}$$

where $R_{ib}$ is less than 1; and where $D_R$=retainer ring diameter;

$L_D$=distance from the bottom of the annular groove to the edge of the groove on the opposite side where the groove is formed by fillets and the distance is drawn along a line that passes through the approximate centers of the corresponding fillets;

$D_G$=diameter of the annular groove;

$E_G$=distance to the groove wall.

An invention has been provided with several advantages. A procedure has been devised to calculate and evaluate the location of internal retaining rings in rubber seals, according to the degree of difficulty of their installation. This procedure can be expressed in a graphical format, so that the ring location and its difficulty of installation can be easily visualized and chosen. The preferred ring location can also be calculated from a design formula. The methodology was applied to the case of joints with triangular grooves. It can be applied to other joint configuration by applying minor changes and consideration.

While the invention has been shown in only one of its forms, it is not thus limited but is susceptible to various changes and modifications without departing from the spirit thereof.

What is claimed is:

1. A method for installing a gasket within a triangular gasket receiving groove provided within the bell end of a pipe section, the bell end having a mouth opening which is engageable with a spigot end of a mating pipe section to form a pipe joint, the method comprising the steps of:

providing a pipe section having a bell end opening;

orienting the pipe section having the bell end along a longitudinal work axis;

providing a sealing gasket formed at least in part of a flexible material, the gasket having a relatively rigid internal retainer ring which circumscribes the gasket interior at one circumferential location;

temporarily transforming the sealing gasket from a generally cylindrical shape to a generally elliptical shape;

inserting the gasket within the mouth opening of the bell end, the annular gasket being oriented at an oblique angle with respect to the longitudinal work axis such that a trailing edge of the gasket engages the annular groove, and a leading edge of the annular gasket is moved past the annular groove provided in the bell end;

exerting a retracting force on the annular gasket by pulling the leading edge thereof backwards in the direction of the mouth opening of the bell end until the gasket again assumes a generally cylindrical shape and snaps into a locked-in position within the annular groove; and wherein the location at which the relatively rigid ring circumscribes the gasket interior is selected according to the following formula:

$$R_{ib} = \frac{2D_R}{L_D + D_G - 4E_G}$$

where when $R_{ib}$ is less than 1 gasket installation is possible, and when $R_{ib}$ is greater than 1 gasket installation is not possible; and where $D_R$=retainer ring diameter;

$L_D$=distance from the bottom of the annular groove to the edge of the groove on the opposite side where the groove is formed by fillets and the distance is drawn along a line that passes through the approximate centers of the corresponding fillets;

$D_G$=diameter of the annular groove;

$E_G$=distance to the groove wall; and wherein the optimum ring location is determined by the intersection of the lines which represent $D_R$ and $E_G$.

2. The method of claim 1, wherein the pipe sections are formed of synthetic plastic materials.

3. The method of claim 2, wherein the pipe sections are formed of a synthetic plastic material selected from the group consisting of polypropylene, polyethylene and polyvinyl chloride.

4. The method of claim 2, wherein the sealing gasket is inserted within the mouth opening of the bell end of the pipe section at an angle less than 90 degrees with respect to the longitudinal working axis of the bell end.

5. The method of claim 1, wherein the sealing gasket is inserted within the mouth opening of the bell end of the pipe section at an angle greater than 90 degrees with respect to the longitudinal working axis of the bell end.

6. The method of claim 1, wherein the relatively rigid ring is made of metal.

7. The method of claim 6, wherein the relatively rigid ring is made of steel.

8. The method of claim 1, wherein the relatively rigid ring has a cross-sectional diameter which defines a locus of points on an inner surface thereof which is equal to or greater than the internal diameter of the remainder of the bell end of the pipe which joins the annular groove.

* * * * *